United States Patent [19]

Svab

[11] 4,414,862
[45] Nov. 15, 1983

[54] PLANETARY GEAR ARRANGEMENT FOR A CONTINUOUSLY VARIABLE TRANSMISSION

[75] Inventor: Eugen Svab, Cologne, Fed. Rep. of Germany

[73] Assignee: Ford Motor Company, Dearborn, Mich.

[21] Appl. No.: 249,577

[22] Filed: Mar. 30, 1981

[30] Foreign Application Priority Data

Apr. 29, 1980 [DE] Fed. Rep. of Germany ....... 3016485

[51] Int. Cl.³ .............................................. F16H 3/44
[52] U.S. Cl. .................................... 74/788; 74/785; 192/13 R
[58] Field of Search ................. 74/785, 786, 787, 788, 74/781 R; 192/13 R

[56] References Cited

U.S. PATENT DOCUMENTS

| 941,727 | 11/1909 | Pouch | 74/785 |
| 2,559,128 | 7/1951 | McFarland | 74/785 |
| 3,077,794 | 2/1963 | Candellero | 192/13 R |
| 3,295,394 | 1/1967 | Whately | 74/785 |
| 3,370,486 | 2/1968 | Lamburn | 74/781 R |

FOREIGN PATENT DOCUMENTS

| 253242 | 3/1963 | Australia | 74/785 |
| 228044 | 10/1943 | Fed. Rep. of Germany | 74/785 |
| 1630298 | 6/1971 | Fed. Rep. of Germany | . |
| 1310217 | 10/1962 | France | 74/785 |
| 2360017 | 3/1978 | France | 74/788 |
| 45-33331 | 10/1970 | Japan | 74/786 |

Primary Examiner—Leslie A. Braun
Assistant Examiner—Lawrence J. Gotts
Attorney, Agent, or Firm—F. G. McKenzie; D. J. Harrington

[57] ABSTRACT

A planetary gear arrangement has mutually meshing first and second planetary pinion sets journalled on a carrier that is fixed to the input shaft. The first planet pinion set meshes also with a sun gear fixed to the output shaft; the second planet pinion set meshes with a ring gear. A slidable clutch can driveably connect the ring gear to the carrier for reverse drive operation and a cone clutch can fix the ring gear against rotation for forward drive operation.

3 Claims, 2 Drawing Figures

PLANETARY GEAR ARRANGEMENT FOR A CONTINUOUSLY VARIABLE TRANSMISSION

BACKGROUND OF THE INVENTION

1. Field of the Invention

This invention relates to the field of continuously variable speed ratio power transmissions and more particularly to a forward and reverse planetary gear arrangement for such transmissions.

2. Description of the Prior Art

The reversing gear arrangement of the epicyclic variable speed ratio transmission described in German Patent No. 1,630,298 requires a substantial amount of space because of its two axially adjacent epicyclic units. The servo devices that actuate the brake bands are located at a point on the perimeter of the transmission. This arrangement causes difficulty particularly in the case of such a transmission used in combination with an internal combustion engine that is disposed across the longitudinal axis of the vehicle. In transmission-engine combinations of this kind the transmission, called a transaxle, has a horizontally disposed traction gear and a differential gear disposed beneath it. The overall space into which a transaxle must be fitted is limited by the relatively short distance between the vehicle wheels.

SUMMARY OF THE INVENTION

It is an object of this invention to provide a planetary gear arrangement for a continuously variable speed ratio transmission of a motor vehicle that requires only minimal package space and consists of the simplest components that may be produced and assembled at a low cost.

According to the present invention this object is realized in an epicyclic gear arrangement that has the planetary gear unit mounted coaxially with the input and output shafts of the transmission. The planetary gear arrangement includes a planet carrier connected to the input shaft, a ring gear, a sun gear connected to the output shaft, a first set of planet pinions driveably engaged with the sun gear and rotatably mounted on the carrier and a second set of planet pinions driveably engaged with the ring gear and with the first set of planet pinions also rotatably mounted on the carrier. Internal and external conical brake and clutch surfaces are formed on respective outer and inner radial surfaces of the ring gear. A cone clutch mounted for axial displacement is driveably connected to the planet carrier when a forward gear piston, which is connected to the cone clutch and mounted for axial displacement toward the cone clutch surfaces, is pressurized. In this way, the cone clutch is selectively brought into engagement with the internal cone clutch surface. When the piston is depressurized, the cone clutch is moved axially away from the internal cone brake surface by the action of a preloaded spring. To produce reverse drive, a cone brake which is fixed against rotation is moved axially into frictional engagement with the ring gear conical brake surface. A reverse drive piston connected to the reverse drive cone brake is pressurized by hydraulic fluid to actuate the reverse drive cone brake. A return spring biases the reverse drive piston to its neutral position when the cylinder in which it works is depressurized. When neither of the cylinders containing the forward gear piston and the reverse gear piston are pressurized the gear arrangement is in neutral and no drive is produced by the transmission.

The ring gear is fixed against rotation for reverse drive through the frictional engagement of the reverse drive cone brake, which is fixed to the transmission casing. Forward drive results when the cone clutch is brought into drive engagement with the ring gear clutch surface because the ring gear is fixed against rotation relative to the planetary carrier and is driveably connected to the output shaft. The components are structurally uncomplicated and easy to manufacture and assemble.

BRIEF DESCRIPTION OF THE DRAWING

The invention is explained in more detail with the aid of the embodiment illustrated in the accompanying drawings.

DESCRIPTION OF THE PREFERRED EMBODIMENT

Figure 1:
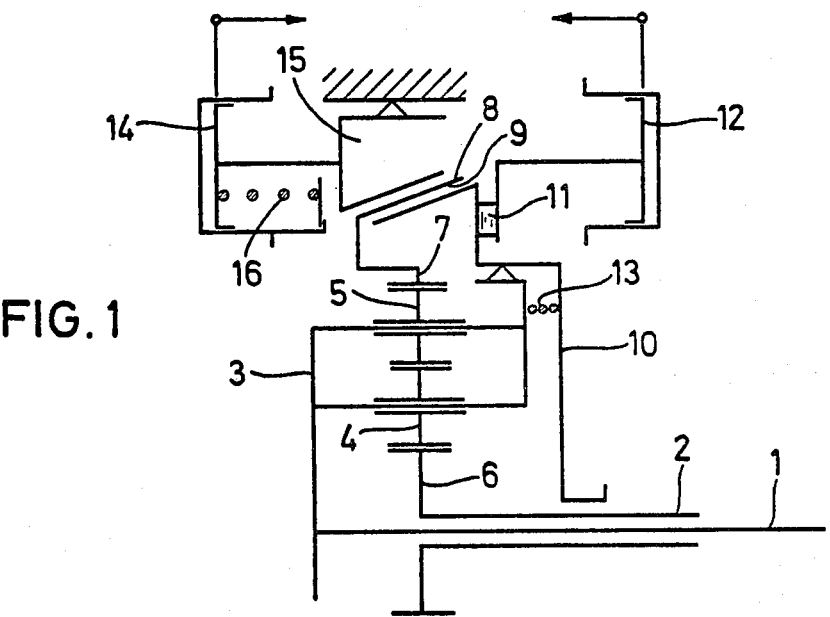
FIG. 1 is a schematic diagram of the drive gear arrangement according to this invention.
Figure 2:
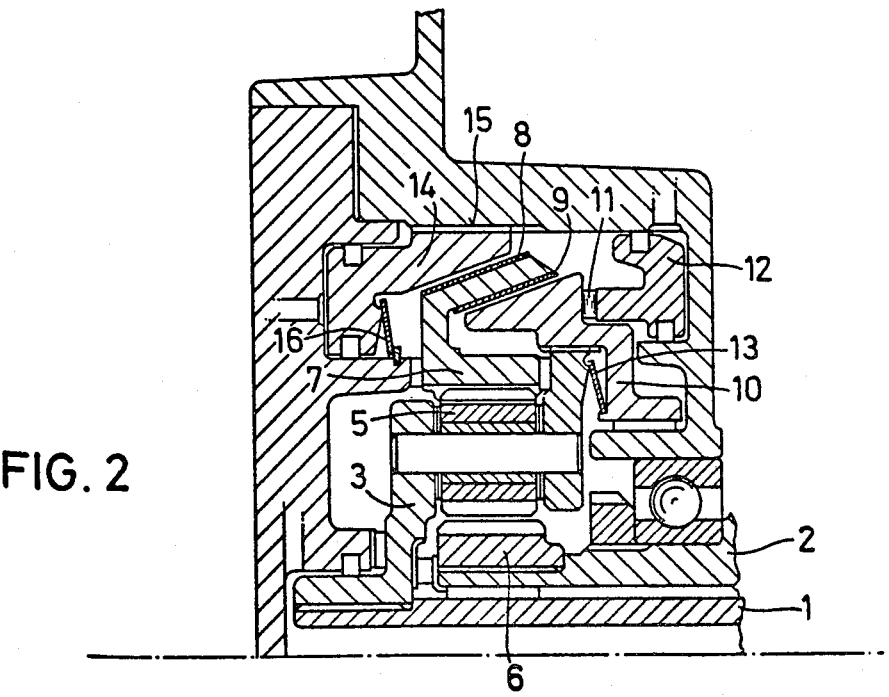
FIG. 2 is a cross section through the planetary gear arrangement of a continuously variable speed ratio transmission according to this invention.

Referring to FIGS. 1 and 2, the input shaft of the forward and reverse drive gear arrangement is designated 1 and can be connected in conventional manner, for example, by way of a hydraulic clutch, with the crankshaft of an internal combustion engine. The output shaft of the transmission designated 2 is a sleeve shaft coaxial with the input shaft 1.

Connected driveably with input shaft 1 is a planet carrier 3 upon which are rotatably mounted first and second planet pinions 4 and 5 meshing with one another. The first pinion 4 is engaged with the sun gear 6, which is permanently connected to the output shaft 2. The second planet pinion 5 is driveably connected with a ring gear. The ring gear has a conical brake surface 8 formed on the periphery of the ring wheel and an internal cone clutch 9 formed on the internal radial surface of the ring wheel.

A cone clutch 10 is permanently, driveably connected with the planet carrier 3 and is mounted for axial, slidable movement on the carrier. The cone clutch can rotate about the axis of the input shaft 1 and is aided in this rotation, though maintaining contact with the end of a forward gear piston 12, by a roller bearing 11. The forward gear piston 12 moves axially in the direction of the arrow within an annual chamber formed in the transmission casing when the chamber is pressurized. This action operates to move the cone clutch 10 axially into driving engagement with the internal cone clutch 9 formed on the ring wheel 7. In this way the ring gear is connected with the planet carrier 3 and the pinion 4 drives the output shaft 2 by way of its engagement with the sun gear 6. The forward drive, therefore, is produced with the transmission locked up and the output shaft is driven by the planet pinions 4, 5. When the annular chamber behind forward gear piston 12 is depressurized, the cone clutch 10 slides axially out of engagement with the cone clutch 9 due to the action of the return spring 13.

The reverse gear piston 14 moves within an annular chamber formed in the transmission casing in the direction of the adjacent arrow when the chamber is pressurized. Piston 14 is fixed to or formed integrally with a cone brake 15 that is mounted for axial motion within the casing but is fixed against rotation by its slidable attachment to the casing. When the reverse gear piston 14 is pressurized, the cone brake 15 frictionally engages the external cone brake surface 8 formed on the ring wheel 7. In this way, the ring gear is fixed to the transmission casing against rotation and the output shaft is driven in the reverse direction by the reversing action of the planet pinions. When the chamber within which the reverse gear piston works is depressurized, a return spring 16 forces cone brake 15 from engagement with the external cone brake surface 8.

As can be best seen in FIG. 2, the individual components of the drive gear arrangement are structurally simple and can be easily assembled within the interior volume of the transmission case, access being gained from the left side of the transmission housing. The forward gear piston 12 and the reverse gear piston 14 are located in well defined annular chambers so that pressurized hydraulic fluid can be directed to the chambers through ducts formed in the housing. The overall axial length of the transmission is minimized because the cone clutches and cone brakes are located radially rather than axially with respect to the ring gear.

Having thus described a preferred embodiment of my invention, what I claim and desire to secure by U.S. Letters Patent is:

1. A forward and reversing gear arrangement for a continuously variable transmission comprising:
   input and output shafts for transmitting power to and from the gearset;
   a planetary gear unit including a planet pinion carrier connected to the input shaft, a ring gear, a sun gear connected to the output shaft, a first set of planet pinions driveably engaged with the sun gear and rotatably mounted on the carrier, and a second set of planet pinions rotatably mounted on the carrier driveably engaged with the ring gear and with the first set of planet pinions;
   first and second conical drive surfaces formed on the ring gear;
   a clutch continuously driveably connected to the carrier, mounted for axial movement toward and away from the ring gear drive surfaces, having a surface adapted to driveably engage one of the ring gear drive surfaces,
   a first piston moveable within a first chamber, adapted to move the clutch into engagement with the first drive surface of the ring gear as the first chamber is pressurized;
   a brake continuously driveably connected to the transmission housing, mounted for axial movement toward and away from the ring gear drive surfaces, having a surface adapted to driveably engage the second ring gear drive surface; and
   a second piston moveable within a second chamber, adapted to move the brake into engagement with the other drive surface of the ring gear as the second chamber is pressurized.

2. The gear arrangement of claim 1 wherein the clutch is mounted on a spline connection to the carrier for movement toward the ring gear from one axial direction and the brake is mounted on a spline connection to the transmission housing for movement toward the ring gear from the opposite axial direction.

3. The gear arrangement of claim 1 wherein forward drive is produced by pressurizing the first chamber, whereby the ring gear is driveably connected to the carrier through engagement of the clutch with the carrier, and reverse drive is produced by pressurizing the second chamber, whereby the ring gear is connected to the transmission housing through engagement of the brake with the ring gear.

* * * * *